United States Patent [19]

Paranjpe et al.

[11] 4,216,479
[45] Aug. 5, 1980

[54] RESISTIVELY COATED DEFLECTION RIBBON FOR AN INK JET PRINTING DEVICE

[75] Inventors: Suresh C. Paranjpe, Xenia; James A. Frey, Kettering, both of Ohio

[73] Assignee: The Mead Corporation, Dayton, Ohio

[21] Appl. No.: 892,519

[22] Filed: Apr. 3, 1978

[51] Int. Cl.² .................................... G01D 15/18
[52] U.S. Cl. ........................................ 346/75
[58] Field of Search ............................. 346/75

[56] References Cited

U.S. PATENT DOCUMENTS 3,701,998  10/1972  Mathis ..................... 346/75

OTHER PUBLICATIONS

West, D. L. et al., Ink Jet Deflection Plate Arrangement, IBM Technical Disclosure Bulletin, vol. 15, No. 2, Jul. 1972, p. 476.

*Primary Examiner*—George H. Miller, Jr.
*Attorney, Agent, or Firm*—Biebel, French & Nauman

[57] ABSTRACT

A conductive deflection ribbon (52) is provided in an ink jet printing device (10) in which the ribbon (100) is coated with a highly resistive material (101). The deflection ribbon (52) is positioned adjacent a row of orifices (26) in an orifice plate (18) from which are expelled series of droplets (84). Selected ones of the droplets (84) are charged in such a manner they are deflected towards a catching device (54) by an electrostatic field established between the deflection ribbon (52) and the catching device (54). The resistive coating (101) inhibits the production of shorts between the charge plate (50), orifice plate (18) catcher (54) and the ribbon (52).

3 Claims, 4 Drawing Figures

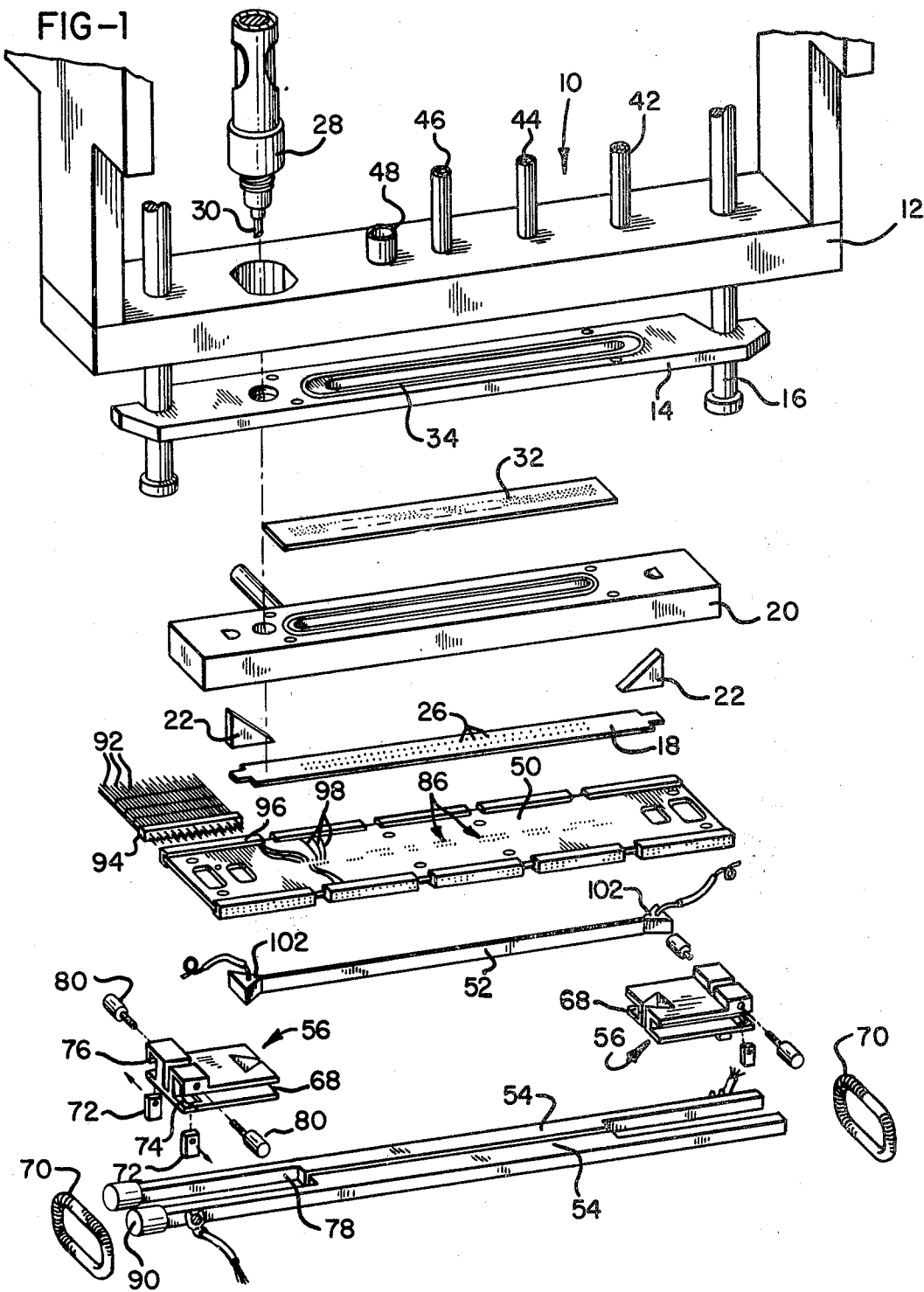

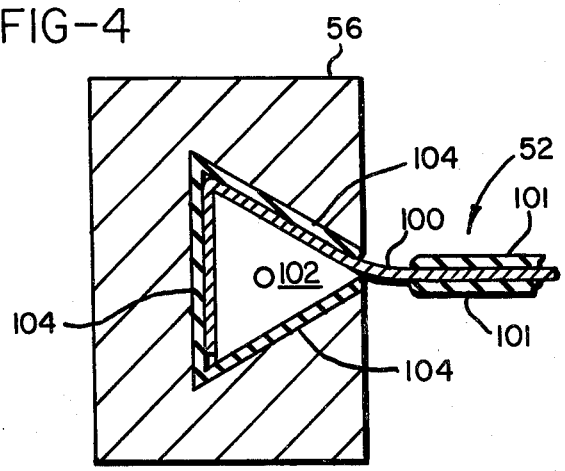
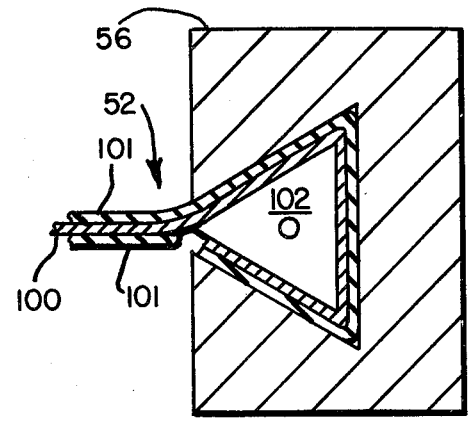
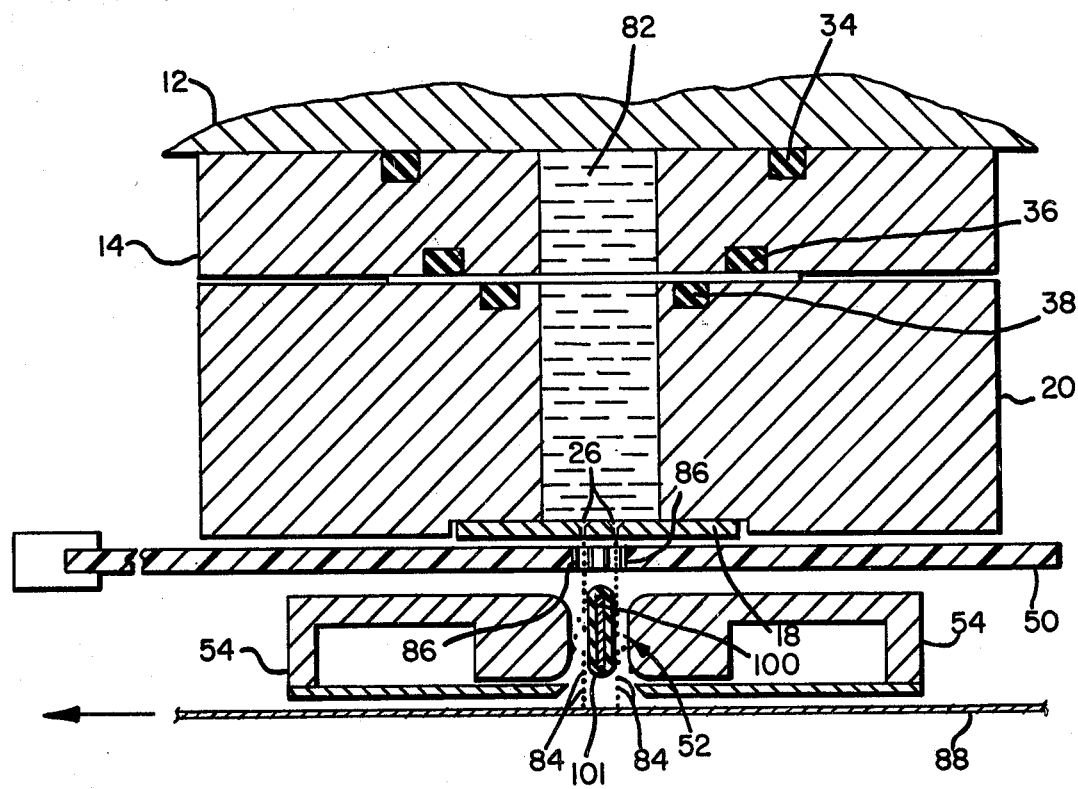

RESISTIVELY COATED DEFLECTION RIBBON FOR AN INK JET PRINTING DEVICE

BACKGROUND OF THE INVENTION

1. Field of the Invention

The present invention relates to ink jet printing devices, and more particularly, to ink jet printing devices which utilize a deflection ribbon to cause selectively charged drops to be deflected from their nominal trajectory.

2. Prior Art

The present invention relates more particularly to ink jet recording devices of the type which use a deflection ribbon for deflecting charged drops into a catching device, such as are disclosed, for example, by Mathis U.S. Pat. No. 3,701,998 and Cassill U.S. Pat. No. 3,787,883. These devices generally incorporate a fluid supply reservoir which supplies a printing liquid to a plurality of orifices disposed in two parallel rows and from which are ejected uniform streams of droplets directed towards a printing medium. A charge plate is utilized to place a desired level of charge on selected ones of the droplets ejected from the orifices. All of the droplets then pass immediately adjacent a deflection ribbon which is oppositely charged from the droplets so that the selectively charged droplets are repelled from the ribbon into an adjacent catcher. The remaining uncharged droplets which are unaffected by the electrostatic field established by the deflection ribbon then impinge on the recording medium in the desired pattern.

One difficulty which has been discovered in the utilization of such printing devices is that due to the development of a fine mist which is generated by the printing liquid, the deflection ribbon and other parts of the ink jet printing device become sufficiently wet that shorts can occur between the charge plate and ribbon or between the catcher and ribbon. This situation is aggravated when the printing medium is a fiberous material such as paper, since fibers sometimes leave the paper and adhere to the ribbon, charge plate, or catchers and thus reduce the clearance therebetween and as a result increase the likelihood of shorts across these various elements.

Such shorts result in a loss of deflection voltage which in turn causes insufficient deflection of the selectively charged droplets in the electrostatic field and will thus cause such droplets to impinge upon the recording medium rather than be caught by the catcher, resulting in distortion in the intended sequence of printing.

Because of the possibility of electrical arcing between the deflection ribbon and adjacent parts of the printing device, it is necessary to keep the voltage on the deflection ribbon relatively low in order to inhibit such arcing. This in turn necessitates the use of a higher charge voltage on the charge ring in order to induce a higher charge on the selected droplets so that the low voltage on the deflection ribbon has sufficient effect on the charged droplets to deflect them into the catcher. It is in turn much more difficult to switch on and off a higher voltage than it is a relatively lower voltage because of the inherent time delay in the voltage dropping from its maximum value to substantially zero. This produces problems in the charge plate control circuitry and ultimately limits the speed at which the printing device can function.

SUMMARY OF THE INVENTION

The present invention overcomes the above described difficulties and disadvantages associated with such prior art devices by providing a deflection ribbon having a resistive coating thereon which substantially reduces the incidence of shorts between the deflection ribbon and adjacent printing head parts, such as the charging plate and the catcher. The degree of resistance of the coating material can be varied substantially, and therefore many materials having relatively high resistance would be suitable as a coating for the deflection ribbon. In fact, even insulative materials have proven to be acceptable for this application.

In this environment the lower end of the range of resistivity of acceptable coating materials is approximately $10^4$ ohms-cm resistivity, although this is not an absolute lower end of the range since the spacing of the various parts of the ink jet printing device from the deflection ribbon has an effect on the acceptable threshold of resistivity of materials being useful as a coating on the deflection ribbon.

A further advantage of the use of a resistively coated deflection ribbon is that the voltage on the deflection ribbon can be substantially increased since arcing between the deflection ribbon and adjacent parts of the ink jet printing device is substantially reduced. Since the charge needed on the selectively charged droplets is decreased because the electrostatic field produced by the deflection ribbon has increased, the charge plate voltage can be substantially reduced and still effect the desired displacement of the charge droplets into the catcher. This then permits a lower charging voltage to be used which has the inherent advantage of reducing the decay time on the charged signal, thus permitting an increase in the print quality of the device.

Attempts have been made to reduce or eliminate the possibility of shorting between charging electrodes which are subject to a similar environment of wetting due to the mist created by the streams of droplets. For example, the patents to Van Breemen et al U.S. Pat. No. 4,035,812 and Robertson U.S. Pat. No. 3,604,980, both disclose charge plate constructions which are provided with resistive material associated with the charging electrodes to reduce the possibility of inter-electrode shorting. However, this does not eliminate the possibility of shorting between the deflection ribbon and the catcher which are downstream from the charging electrodes and thus does not directly face the problem with which the present invention is concerned.

BRIEF DESCRIPTION OF THE DRAWINGS

FIG. 1 is an expanded pictorial view of a printing head for an ink jet printing device incorporating the preferred embodiment of a deflection ribbon of the present invention;

FIG. 2 is a transverse cross sectional view through the embodiment of FIG. 1 in the assembled position;

FIG. 3 is a first alternative means of securing the end portions of the deflection ribbon of the preferred embodiment; and FIG. 4 is a second alternative means for securing the deflection ribbon of the preferred embodiment

DETAILED DESCRIPTION OF THE PREFERRED EMBODIMENT

With reference to FIG. 1 of the drawings it will be seen that the various elements of an ink jet printing head assembly 10 are assembled for support by a support bar 12. Assembly thereto is accomplished by attaching the elements by means of machine screws (not shown) to a clamp bar 14 which is in turn connected to the support bar 12 by means of clamp rods 16.

The recording head comprises an orifice plate 18 soldered, welded or otherwise bonded to fluid supply manifold 20 with a pair of wedge-shaped acoustical dampers 22 therebetween. Orifice plate 18 is preferably formed of a relatively stiff material such as stainless steel or nickel coated beryllium-copper, but is relatively thin to provide the required flexibility for direct contact stimulation. Preferably, dampers 22 are cast in place and are formed of polyurethane rubber or other suitable damping material.

Orifice plate 18 contains two rows of orifices 26 and is preferably stimulated by a stimulator 28 which is threaded into clamp bar 14 to carry a stimulation probe 30 through the manifold 20 and into direct contact with plate 18. A filter plate 32 is provided to prevent clogging of orifices 26. O-rings 34, 36 and 38 are used to prevent leakage from the head assembly. Service connections for the recording head include a printing fluid supply tube 42, air exhaust and inlet tubes 44 and 46, and a tube 48 for connection to a pressure transducer (not shown).

Other major elements comprising the recording head assembly 10 are a charge ring plate 50, an electrically conductive deflection ribbon 52 and a pair of catchers 54. Catchers 54 are supported by holders 56 which are fastened directly to fluid supply manifold 20. Deflection ribbon 52 is also supported by holders 56 and is stretched tightly therebetween by means described in detail below. Ribbon 52 extends longitudinally between catchers 54 as best shown in FIG. 2.

Catchers 54 are laterally adjustable relative to ribbon 52. This adjustability is accomplished by assembling the head with catchers 54 resting in slots 68 of holders 56, and urging them mutually inward with a pair of elastic bands 70. Adjusting blocks 72 are inserted upwardly through recesses 74 and 76 to bear against faces 78 of catchers 54, and adjusting screws 80 are provided to drive adjusting blocks 72 and catchers 54 outwardly against elastic bands 70.

The fully assembled recording head is shown in cross section in FIG. 2. As therein illustrated printing fluid 82 flows downwardly through orifices 26 forming two rows of streams which break up into two curtains of drops 84. Drops 84 then pass through two rows of charge rings 86 in charge ring plate 50 and thence into one of the catchers 54 or onto the moving web of paper 88. Switching of drops between "catch" and "deposit" trajectories is accomplished by electrostatic charging and deflection as hereinafter described. Coordinated printing capability is achieved by staggering the two rows of streams in accordance with the teachings of Taylor et al U.S. Pat. No. 3,560,641.

Formation of drops 84 is closely controlled by application of a constant frequency, controlled amplitude, stimulating disturbance to each of the fluid streams emanating from orifice plate 18. Disturbances for this purpose may be set up by operating transducer 28 (in FIG. 1) to vibrate probe 30 at constant amplitude and frequency against plate 18. This causes a continuing series of bending waves to travel the length of plate 18; each wave producing a drop stimulating disturbance each time it passes one of the orifices 26. Dampers 22 prevent reflection and repropagation of these waves.

Accordingly, each stream comprises an unbroken fluid filament and a series of uniformly sized and regularly spaced drops all in accordance with well known techniques.

As each drop 84 is formed it is exposed to the charging influence of one of the charge rings 86. If the drop is to be deflected and caught, an electrical charge is applied to the associated charge ring 86 during the instant of drop formation. This causes an electrical charge to be induced in the tip of the fluid filament and carried away by the drop. As the drop traverses the deflecting field set up between ribbon 52 and the face of the adjacent catcher, it is deflected to strike and run down the face of the catcher, where it is ingested, and carried off. Drop ingestion may be promoted by application of a suitable vacuum to the ends 90 of catchers 54. When drops are to be deposited on the web 88, no electrical charge is applied to the associated charge rings.

Appropriate charges for accomplishment of the above mentioned drop charging are induced by setting up an electrical potential difference between orifice plate 18 (or any other conductive structure in electrical contact with the printing fluid supply) and each appropriate charge ring 86. These potential differences are created by grounding plate 18 and applying appropriately timed voltage pulses to wires 92 in connectors 94 (only one connector illustrated). Connectors 94 are plugged into receptacles 96 at the edge of charge plate 50 and deliver the mentioned voltage pulses over printed circuit lines 98 to charge rings 86.

Charge plate 50 is fabricated from insulative material and charge ring 86 are merely a coating of conductive material lining the surfaces of orifices in the charge ring plate. Voltage pulses for the above purpose may be generated by circuits of the type disclosed in Taylor et al, and wires 92 receiving these pulses may be matched with charge rings 86 on a one-to-one basis.

Deflection of these drops 84 which are to be caught is accomplished by setting up appropriate electrical fields between deflection ribbon 52 and each of the catchers catchers 54. The preferred arrangement for this function is to have catchers 54 and one side of an electrical potential source all connected to a common ground. The other side of the potential source is then connected to deflection ribbon 52 thereby setting up a pair of equal strength, oppositely directed electrical deflection fields. With reference to FIG. 2, with the ground at the positive side of the potential source, it is necessary that drops 84 be charged negatively in order to be caught. However, it is also possible to obtain mutual outward deflection of the two curtains of drops 84 by charging the drops positively and reversing the terminal on the potential source.

The deflection ribbon 52 must be relatively thin and straight for proper operation in the compactly arranged printing head in which the two adjacent rows of orifices are quite close together. Thus, in the preferred embodiment the deflection ribbon has a stainless steel core 100 approximately 0.010 inch thick and is held under tension between and parallel to the rows of orifices 26, as shown in FIG. 2. A coating 101 of resistive material approximately 0.001–0.003 inch thick on each side of the core is provided.

In the preferred embodiment, the resistivity of this material should be approximately at least $10^4$ ohms-cm, although this is not an absolute lower end of the range since spacing of the various parts of the ink jet printing head from the deflection ribbon and thickness of the coating have an effect on the acceptable threshold of resistivity of materials being useful as a coating on the core material of the deflection ribbon. Likewise, the material from which the core is made and its conductivity values will also affect the materials which can be used as resistive coatings therein. It has further been discovered that the resistive material can be insulative in nature and thus insulative materials from the upper bound of the range of resistivity of the coating.

Any resistive or insulative coating having the specified range of resistivity indicated above is believed to be satisfactory. However, examples of materials which would provide resistivity within the range at acceptable thickness, i.e. approximately 0.001 inch, include inorganic transition metal oxides of chromium, titanium, molybdenum, etc. or metal oxides of aluminium, silicon and iron, and organic materials such as polyvinylcarbazole and acrylics.

It is noteworthy that initially it was believed that the insulative coating might not perform satisfactorally due to a build up of an opposite charge on the surface of the insulating coating which would not dissipate sufficiently fast and thus result in a counteraction to the deflection field which could in turn result in insufficient deflection of the charge droplets to be caught by the catcher. It was discovered, however, in actual operation that this does not occur. It is theorized that one possible reason for the insulative coating being acceptable is that the surface charge is dissipated due to the "wet" condition existing on the ribbon during actual operation. It is believed that this wet condition may permit the bleeding off of the opposite charge from the surface of the ribbon sufficiently rapidly that an opposite surface charge does not accumulate sufficiently to interfere with operation of the deflection ribbon. This is only a theory, however, and it is not certain that this is actually what occurs.

It is also noteworthy that although the preferred embodiment of the deflection ribbon involves the use of a single stainless steel band, other conductive materials could be used for the core section, such as copper. In addition, it may be possible to use multiple cores disposed in parallel alignment each insulated and independently connected to the potential source.

Because of the relative flexibility of the deflection ribbon due to its thinness, means must be provided for holding the ribbon at its ends under tension so that the ribbon will be held taught in a vertical plane between the rows of droplets. There are obviously many ways in which this can be accomplished and FIGS. 3 and 4 schematically set out two examples. FIG. 3 illustrates an embodiment in which the entire deflection ribbon has been coated and then a portion of the resistive coating stripped away along each end of the deflection ribbon on the side which will contact the electrode 102. The opening in the holder 56 which is secured to the printing head in any desired manner is of a general dovetail configuration corresponding to the triangular shape of electrode 102 and will thus hold the ribbon in place by frictional engagement between the ribbon, the electrode and the holder 56.

A similar arrangement is illustrated in FIG. 4, but in this case the resistive coating 101 is stripped from both sides of each end portion of the core 100 of deflection ribbon 52 leaving the steel core exposed on both sides. An insulative coating 104 is then placed around the inside of the opening in holder 56 such as by coating or by use of an insert, and then the electrode 102 and the bare portion of the steel core which engages the electrode are inserted in a similar dove-tail opening configuration to prevent the deflection ribbon from being withdrawn and to hold it in tension between the rows of orifices.

Thus it can be seen that by using a resistively coated deflection ribbon 52 constructed in accordance with the present invention the possibility of shorts from the deflection ribbon to the catcher 54 or to the charge plate 50 can be substantially reduced due to the resistive coating. This in turn permits an increase in the voltage applied to the deflection ribbon and thus in turn allows the voltage applied to the charge rings to be reduced. Since the charging voltage is constantly switched on and off, the ability to reduce this voltage level reduces the switching time and thus permits an increase in operating speed of the switching mechanism. Furthermore, failure of printing due to shorts is significantly reduced.

While the form of apparatus herein described constitutes a preferred embodiment of this invention, it is to be understood that the invention is not limited to this precise form of apparatus, and that changes may be made therein without departing from the scope of the invention.

What is claimed is:

1. In an ink jet printing device for printing on a recording medium and having a printing head providing a continuous supply of ink to a plurality of orifices aligned in two parallel rows to produce a continuous supply of droplets from each orifice, a charging surface downstream of each said orifice for placing a charge on selective ones of said droplets and catching means for catching said selectively charged droplets so as to prevent them from impinging on the recording medium, the improvement comprising:

droplets deflection means including a conductive ribbon extending between said rows of orifices downstream from said charging surfaces and upstream from the catching means along the path of travel of said droplets issuing from said orifices, for supplying a continuous electric field across the path of said droplets issuing from each said orifice so that said selectively charged droplets would be deflected into said catching means, said ribbon having a resistive coating of at least $10^4$ ohm-cm along the entire path of movement of said droplets adjacent said deflection means for preventing shorts between said deflection means and other parts of said printing device.

2. The improvement as defined in claim 1 wherein said coating completely surrounds said ribbon for the length of said row of orifices.

3. The improvement as defined in claim 1 wherein said coating is insulative.

* * * * *